No. 831,300. PATENTED SEPT. 18, 1906.
H. H. ROOSA.
POWER TRANSMITTING MECHANISM.
APPLICATION FILED SEPT. 11, 1905. RENEWED JUNE 22, 1906.
3 SHEETS—SHEET 1.
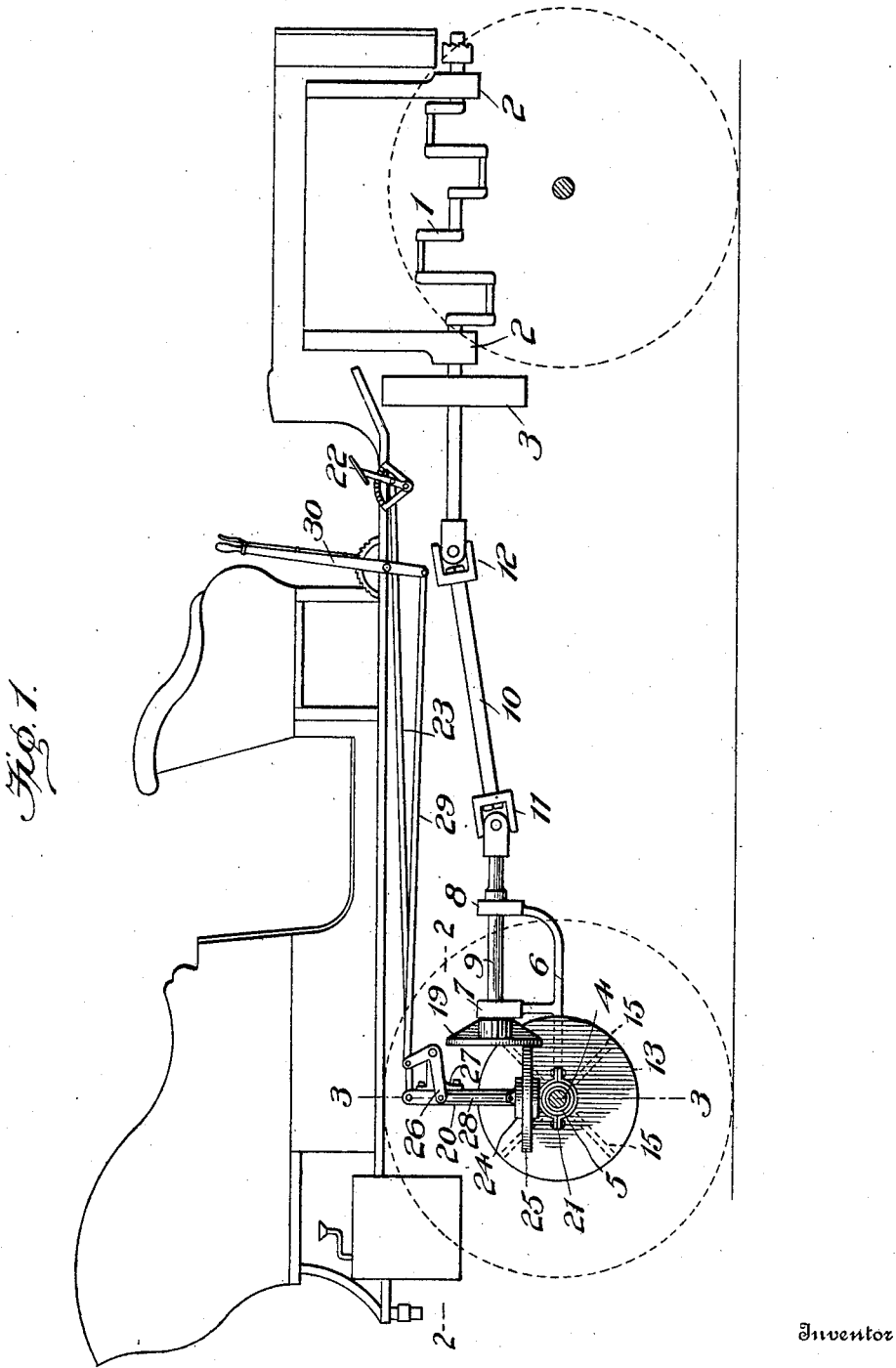
Witnesses
Edwin L. Bradford
C. L. Wheeler
Inventor
Herbert H. Roosa
By Dudley, Browne & Norton
his Attorneys

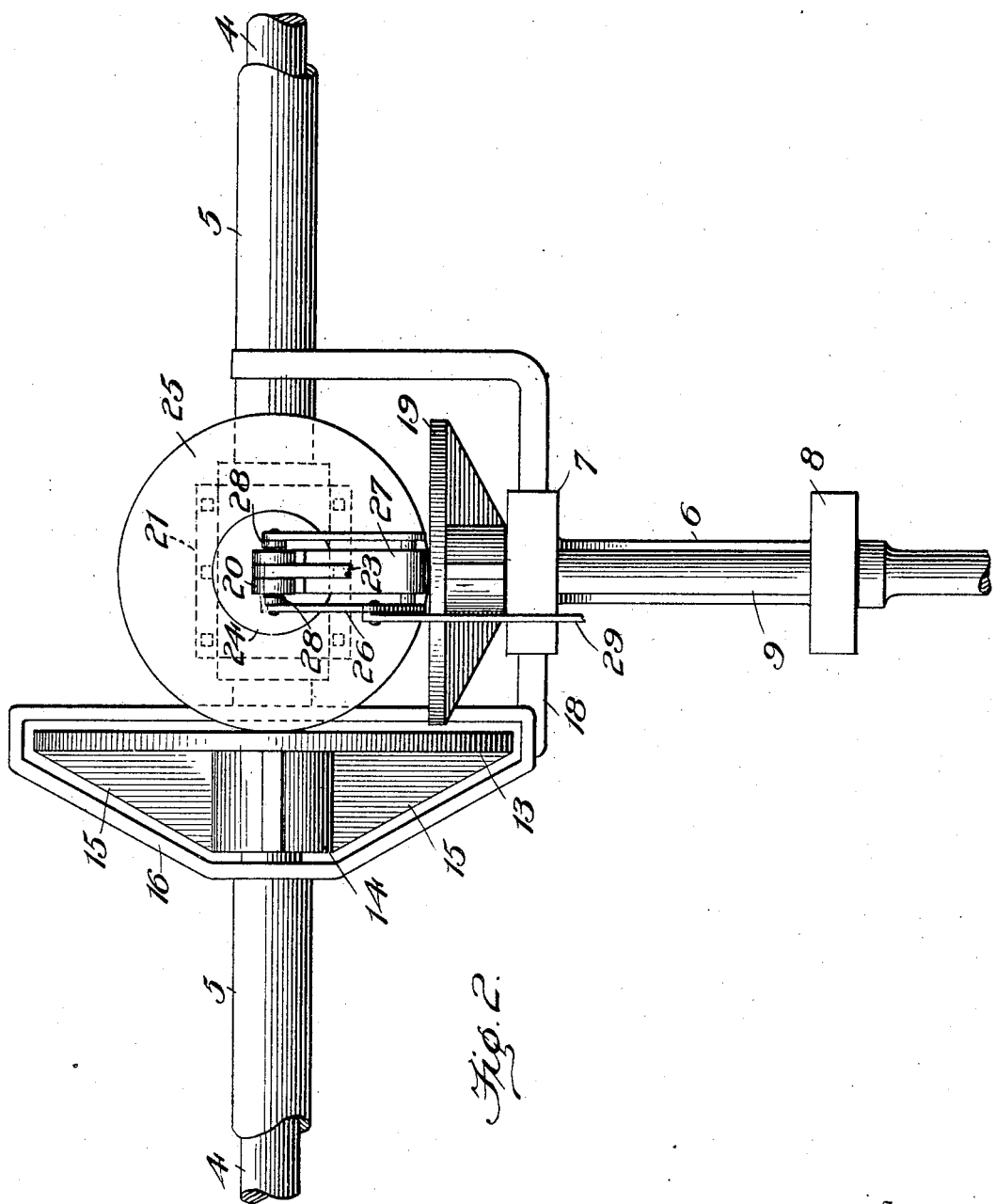

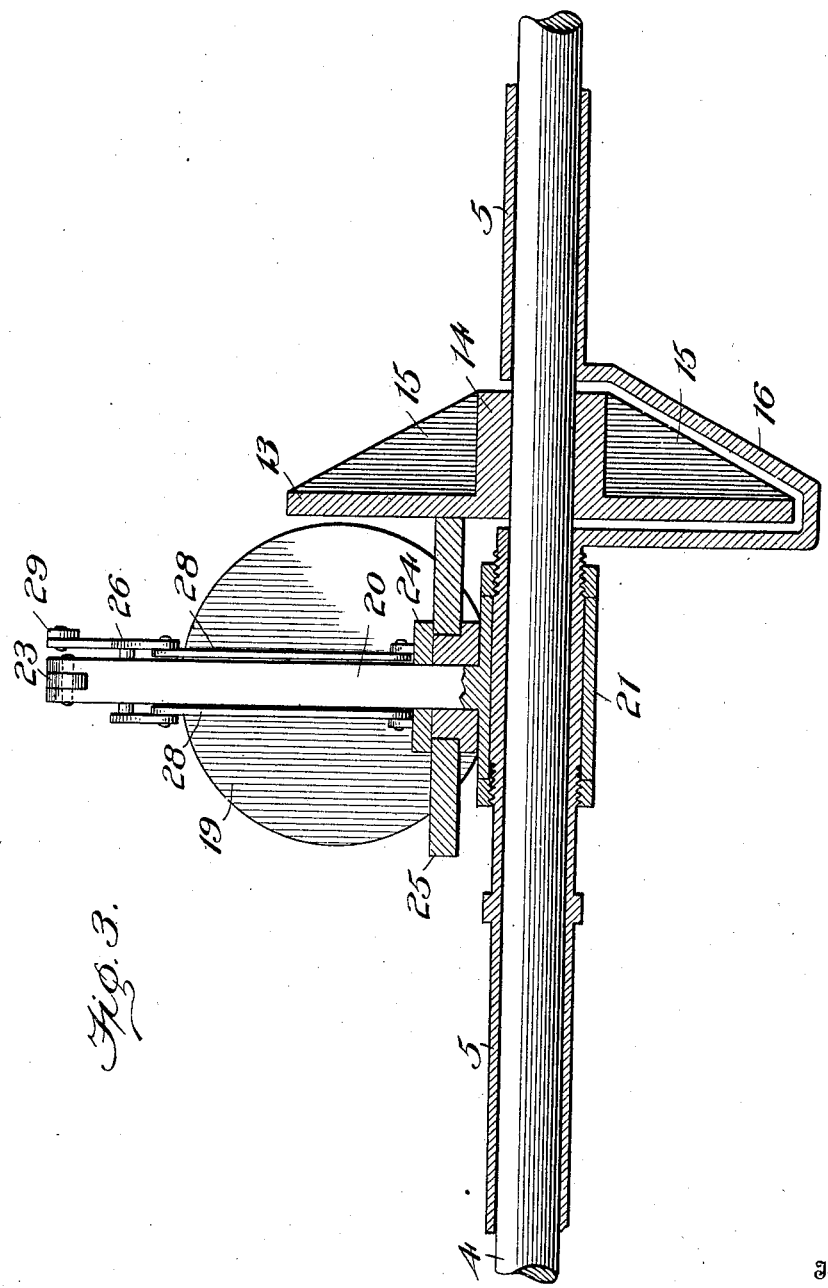

UNITED STATES PATENT OFFICE.

HERBERT H. ROOSA, OF LINCOLN, NEBRASKA.

POWER-TRANSMITTING MECHANISM.

No. 831,300.  Specification of Letters Patent.  Patented Sept. 18, 1906.

Application filed September 11, 1905. Renewed June 22, 1906. Serial No. 322,953.

*To all whom it may concern:*

Be it known that I, HERBERT H. ROOSA, a citizen of the United States, residing at Lincoln, in the county of Lancaster and State of Nebraska, have invented certain new and useful Improvements in Power-Transmitting Mechanism; and I do hereby declare the following to be a full, clear, and exact description of the invention, such as will enable others skilled in the art to which it appertains to make and use the same.

This invention relates to an improved power-transmitting mechanism designed more especially for use in motor-propelled vehicles.

An object of the invention is to provide a simply-constructed, efficient, and reliable gearing of the friction type for the transmission of power from the motor to the propelling-wheel shaft or axle whereby to dispense with the employment of spur, bevel, sprocket, and like gearing and to simplify the operations of starting and stopping, reversing, and varying the speed of the vehicle.

A further object of the invention is to obtain direct transmission of power from the motor to the friction-gearing, this being accomplished by the use of a sectional flexibly-joined intermediate shaft.

Other objects and advantages of the invention are set forth in the following detailed description, in connection with which reference is to be had to the accompanying drawings, illustrating the improvements in their preferred form of embodiment, it being understood that various changes and modifications may be made therein without exceeding the scope of the concluding claims.

In the drawings, Figure 1 is an elevation, partly in section, of a motor-vehicle equipped with power-transmitting mechanism embodying the invention. Fig. 2 is a sectional view on line 2 2 of Fig. 1. Fig. 3 is a sectional view on line 3 3 of Fig. 1.

Referring to the drawings by numerals, 1 designates the crank-shaft for the motor, (not shown,) said shaft being journaled in bearings 2 and equipped with a fly-wheel 3. The engine or motor and crank-shaft are preferably located in the front end of the vehicle, and power is transmitted therefrom, preferably, to the rear shaft or axle 4.

Encircling the rear shaft or axle is a casing 5, from which projects a bracket 6, having upwardly-extending arms carrying, preferably, ball-equipped bearings 7 8 for a horizontal shaft 9. An intermediate shaft member 10 has end connection by universal joints 11 12 with the shaft 9 and crank-shaft 1, whereby the power from the motor is directly transmitted to the shaft 9.

Fixed on the rear shaft or axle 4 is a vertically-disposed disk 13, equipped at one side with a hub 14 and radially-disposed stiffening-ribs 15 and inclosed by a casing 16, which may be integral with or secured to the casing 5. The bracket 6 and casing member 16 are connected together by a brace 18, as shown more clearly in Fig. 2. The shaft 9 carries a vertically-disposed disk 19, rotating therewith and constructed similarly to the disk 13, being at a right angle to and slightly separated from the latter.

Erected from the casing 5 is an arm 20, preferably square in cross-section. The arm is loosely attached at its lower end to said casing by a clip or like means 21, whereby it may swing forwardly and rearwardly, these movements being imparted by a foot-lever 22 at the operator's seat through the medium of a connecting-rod 23. Vertically slidable on the arm 20 is a hub 24, on which is rotatably mounted a disk 25 in constant frictional engagement with the disk 13. A bell-crank lever 26, pivoted to a bracket 27 on the arm 20, is connected at one of its arms with the hub 24 through the medium of links 28 and at its other arm by a rod 29 to a hand-lever 30, located to be within reach of the operator. The levers 22 and 30 are preferably equipped with manually-released locking means, as shown.

In operation movement of the arm 20 to cause frictional engagement or disengagement of the disks 25 and 19 is effected by movement of the foot-lever 22. It will be understood that while the motor is running the disk 19 is constantly rotated, and when this disk is in active position the shaft or axle 4 is rotated through the frictional engagement of the disks 19, 25, and 13. In its idle position the disk 25 is out of engagement with the disk 19 and no power is applied to the shaft or axle. With the parts in the position shown in Fig. 1 the vehicle will be propelled in the forward direction at full speed, inasmuch as the periphery of the disk 25 is in engagement with the disk 19 at the farthermost point from the axis of the latter. Reductions in speed are obtained by raising the disk 25 through the medium of the hand-lever 30 to other positions between the farthermost point of engagement and the axis of the disk 19, and when the disk 25 is moved to a position above said axis the direction of rotation of the shaft or axle is reversed, and the vehicle is propelled rearwardly. The disk 13 may be located at either side of the disk 25, as shown, and is adjusted relatively to the latter to compensate for wear by moving the arm 20 along the casing 5 and fastening it in place.

It will be observed that the support for the shaft 9 is rigid with the support of the disk 13. Thus the driving and driven disks are maintained in relative position and proper transmission of power is at all times assured.

I claim as my invention—

1. A power-transmitting mechanism, comprising a driving-disk, a driven disk at a right angle to the driving-disk, an intermediate disk at right angles to both said disks and in constant frictional engagement with the driven disk, means for moving the intermediate disk into and out of frictional engagement with the driving-disk, and means for moving said intermediate disk relative to the axes of said driving and driven disks.

2. A power-transmitting mechanism, comprising a driving-disk, a driven disk and an intermediate disk in constant frictional engagement with one of said disks, and means for moving said intermediate disk into and out of frictional engagement with the other of said disks.

3. A power-transmitting mechanism, comprising a driving-disk, a driven disk in fixed relation to the driving-disk, an intermediate disk in constant frictional engagement with the driven disk, means for moving the intermediate disk laterally into and out of frictional engagement with the driving-disk, and means for moving the intermediate disk relatively to the axes of said driving and driven disks.

4. A power-transmitting mechanism, comprising a driving-disk directly coupled with the source of power, a driven disk, an intermediate disk in constant frictional engagement with the driven disk, means for moving the intermediate disk into and out of frictional engagement with the driving-disk, and means for moving the intermediate disk relatively to the axes of said driving and driven disks.

5. A power-transmitting mechanism, comprising a shaft or axle, a driven disk fixed thereon, a driving-disk, an arm pivoted at one end on said shaft or axle, an intermediate disk slidable on said arm and in constant frictional engagement with the driven disk, means for moving said arm to bring the intermediate disk into and out of engagement with the driving-disk, and means for moving the intermediate disk along said arm to adjust the latter relative to the axes of the driving and driven disks.

6. A power-transmitting mechanism, comprising a shaft or axle, a casing inclosing the same, a driven disk fixed on the shaft or axle, an arm pivoted at its lower end on said casing concentrically with the shaft or axle, a hub slidable on said arm, an intermediate disk rotatable on said hub and in constant frictional engagement with the driven disk, a driving-disk in fixed relation to but out of engagement with the driven disk, means for moving the arm and intermediate disk to bring the latter into and out of engagement with the driving-disk, and means for moving the intermediate disk along the arm and relative to the axes of the driving and driven disks.

7. A power-transmitting mechanism, comprising a shaft or axle, a casing inclosing the same, a casing-inclosed driven disk fixed on the shaft or axle, a bracket rigid with said casing, a shaft journaled in bearings in said bracket, a driving-disk fixed on said shaft, an arm pivoted on said casing, and a disk carried by said arm and arranged intermediate of the driving and driven disks.

In testimony whereof I affix my signature in presence of two witnesses.

HERBERT H. ROOSA.

Witnesses:
W. L. ANDERSON,
I. E. PEARSON.